United States Patent [19]

Murakami

[11] 4,416,446

[45] Nov. 22, 1983

[54] VIBRATION-ATTENUATING COUPLING DEVICE

[75] Inventor: Masamitsu Murakami, Yokosuka, Japan

[73] Assignee: Nissan Motor Company, Limited, Kanagawa, Japan

[21] Appl. No.: 281,363

[22] Filed: Jul. 8, 1981

[30] Foreign Application Priority Data

Jul. 25, 1980 [JP] Japan .............. 55-105786[U]

[51] Int. Cl.³ .............................................. F16F 3/08
[52] U.S. Cl. ................................ 267/140.3; 267/141.2
[58] Field of Search .............. 267/140.3, 141.1, 141.2, 267/141.4, 141.5

[56] References Cited

U.S. PATENT DOCUMENTS

| | | |
|---|---|---|
| 3,035,799 | 5/1962 | Peirce .............................. 267/140.3 |
| 3,117,054 | 1/1964 | Antonucci . |
| 3,193,237 | 7/1965 | Adams . |
| 3,544,048 | 12/1970 | Oshima et al. . |
| 3,610,610 | 10/1971 | Chassagne . |
| 3,680,851 | 8/1972 | Takada . |
| 4,286,777 | 9/1981 | Brown ......................... 267/141.1 X |

FOREIGN PATENT DOCUMENTS

| | | |
|---|---|---|
| 1162788 | 4/1958 | France . |
| 1488643 | 6/1967 | France . |
| 2166583 | 8/1973 | France . |
| 508455 | 6/1939 | United Kingdom . |
| 534400 | 3/1941 | United Kingdom . |
| 674762 | 7/1952 | United Kingdom . |
| 1132954 | 11/1968 | United Kingdom . |
| 2003250A | 3/1979 | United Kingdom . |

Primary Examiner—Duane A. Reger

[57] ABSTRACT

A vibration-attenuating coupling device for use with two rigid members one of which is subject to vibrations produced by, for example, an internal combustion engine installed on an engine driven vehicle, characterized by a laminar vibration absorptive structure composed of a main resilient member fitted to the rigid member subject to vibrations and at least one auxiliary resilient member smaller in spring constant and secured between the main resilient member and the rigid member to be isolated from the vibrations transmitted to the other rigid member.

6 Claims, 7 Drawing Figures

VIBRATION-ATTENUATING COUPLING DEVICE

FIELD OF THE INVENTION

The present invention relates to a vibration-attenuating coupling device and, more particularly, to a vibration-attenuating coupling device for coupling two members such as structural members of an engine-driven vehicle. The structural members of an engine-driven vehicle are typically a member forming part of the body structure of the vehicle and a member forming part of a support structure having supported thereon the air cleaner of or securely connected to the engine installed on the vehicle.

SUMMARY OF THE INVENTION

In accordance with the present invention, there is proposed a vibration-attenuating coupling device for use with a first member having inner and outer faces and formed with an opening having a center axis and a second member having inner and outer faces and formed with an opening having a center axis substantially aligned with the opening in the first member, comprising a laminar vibration absorptive structure securely fitted to said first member through the opening therein and having opposite end faces one of which is securely attached to the inner face of the second member, and rigid fastening elements held in engagement the other end face of the vibration absorptive structure and with the outer face of the second member through the opening in the second member, the vibration absorptive structure comprising a first resilient member fitted to the first member through the opening therein and a second resilient member secured between the first resilient member and the inner face of the second member and smaller in spring constant than the first resilient member.

The laminar vibration absorptive structure may further comprises a third resilient member secured between the first resilient member and one of the fastening elements and smaller in spring constant than the first resilient member.

BRIEF DESCRIPTION OF THE DRAWINGS

Drawbacks of a prior-art vibration-attenuating coupling device and detailed features and advantages of a vibration-attenuating coupling device according to the present invention will be understood from the following description taken in conjunction with the accompanying drawings, in which like reference numerals represent similar or corresponding members and elements and in which.

BACKGROUND OF THE INVENTION

Figure 1:
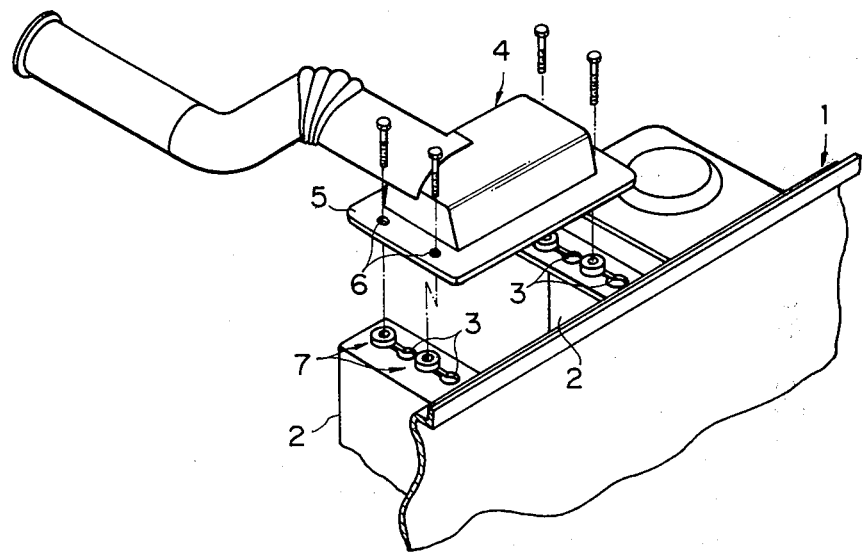
FIG. 1 is a fragmentary perspective view showing an air-cleaner support arrangement incorporated in an engine-driven vehicle and including prior-art vibration-attenuating coupling units.

Referring first to FIG. 1 of the drawings, a front engine compartment of an engine-driven vehicle such as an automotive vehicle driven by an internal combustion engine is sidewise defined by a pair of hood ledge panels one of which is in part shown and designated by reference numeral 1. The hood ledge panel 1 forms part of the body structure of the vehicle and has a pair of bracket members 2 projecting laterally from the hood ledge panel 1 into the engine compartment. Each of the bracket members 2 is formed with a plurality of openings 3.

On the other hand, an air cleaner 4 of the engine installed in the engine compartment is mounted on an air-cleaner support bracket member 5 formed with openings 6 which are arranged respectively in correspondence with the openings 3 in the bracket members 2 secured to the hood ledge panel 1. The air-cleaner support bracket member 5 in turn is securely attached to the bracket members 2 by means of a suitable number of conventional vibration-attenuating coupling units 7. Each of the vibration-attenuating units 7 includes a generally cylindrical, unitary vibration absorptive block 8 which is shown to an enlarged scale in FIG. 2 of the drawings.

Figure 2:
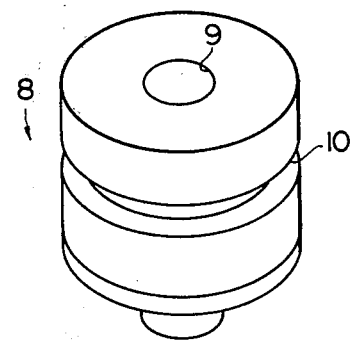
FIG. 2 is a perspective view showing, to an enlarged scale, a vibration absorptive block forming part of each of the vibration-attenuating coupling units used in the air-cleaner support arrangement illustrated in FIG. 1.
Figure 3:
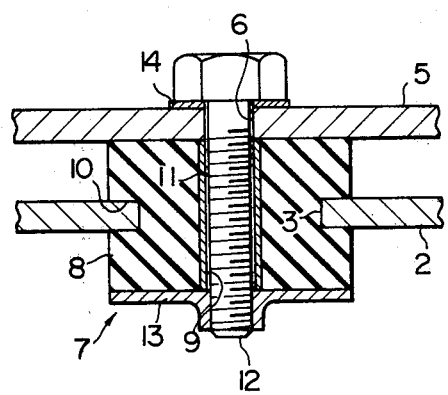
FIG. 3 is a sectional view showing, also to an enlarged scale, each of the vibration-attenuating coupling devices provided in the air-cleaner support arrangement illustrated in FIG. 1.

As illustrated in FIG. 2, the vibration absorptive block 8 is formed with an axial bore 9 and a circumferential groove 10 and, as shown in FIG. 3, has a cylindrical collar 11 axially inserted into the bore 9 and securely attached to the inner peripheral surface of the block 8.

The vibration absorptive block 8 thus shaped and provided with the collar 11 is fitted to one of the bracket members 2 on the hood ledge panel 1 (FIG. 1) through the opening 3 in the bracket 2 and the circumferential groove 10 in the block 8. Furthermore, the vibration absorptive block 8 is secured to the air-cleaner support bracket member 5 by means of a bolt 12 and a nut plate 13. The bolt 12 is axially passed through the collar 11 from the outer or upper side of the air-cleaner support bracket member 5 and has a threaded leading end portion axially projecting outwardly from the collar 11. The nut plate 13 is tightened to the threaded leading end portion of the bolt 12 and is thus closely attached to one end face of the vibration absorptive block 8. The vibration absorptive block 8 is thus closely interposed under compression between the nut plate 13 and the lower or inner face of the bracket member 5 and has the other end face attached to the lower or inner face of the bracket member 5. Between the air-cleaner support bracket member 5 and the head portion of the bolt 12 is interposed a washer 14. The air cleaner support bracket member 5 is in this fashion resiliently coupled to the bracket members 2 on the hood ledge panel 1 (FIG. 1) by means of the vibration-attenuating units 7 each constructed as hereinbefore described.

One of the important requirements of the air-cleaner support arrangement of the above described nature is that the vibration absorptive block 8 of each of the vibration-attenuating coupling units 7 be fitted with certainty to the bracket members 2 on the hood ledge panel 1. In order to satisfy such a requirement, the resilient material used as the vibration-absorptive block 8 is selected to have a comparatively large spring constant. The result is that the vibrations produced in the engine are not satisfactorily dampened by the block 8 and are to an appreciable degree transmitted to the air cleaner 4 by way of the hood ledge panel 1, bracket members 2, vibration-attenuating coupling units 7 and air-cleaner support bracket member 5 in the air cleaner support arrangement illustrated in FIG. 1. The vibrations thus transmitted to the air cleaner 4 are amplified therein. The amplified vibrations are transmitted back to the hood ledge panel 1 through the air cleaner support bracket 5, vibration-attenuating coupling units 7 and bracket members 2 and further from the hood ledge panel 1 to the instrument panel (not shown) of the vehicle body.

The present invention contemplates elimination of such a drawback of prior-art vibration-attenuating coupling device used in, for example, an air-cleaner support arrangement of the nature hereinbefore described.

DESCRIPTION OF THE EMBODIMENTS

Figure 4:
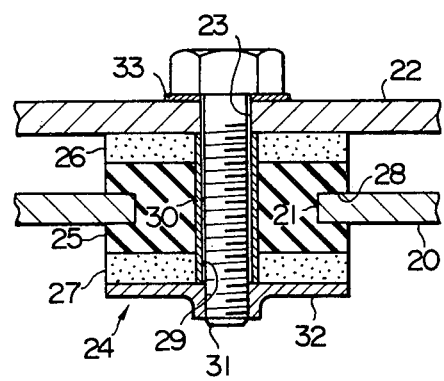
FIG. 4 is a sectional view of a first embodiment of a vibration-attenuating coupling device according to the present invention.

In FIG. 4 of the drawings, a first embodiment of the vibration-attenuating coupling device according to the present invention is shown provided in combination with two rigid members which are spaced apart in parallel from each other or which at least have portions spaced apart in parallel from each other. The two rigid members consist of a first rigid member 20 having inner and outer faces and formed with a circular opening 21 and a second rigid member 22 having inner and outer faces and formed with a circular opening 23. The respective inner face of the first and second rigid members 20 and 22 confront each other. The respective openings 21 and 23 in the first and second rigid members 20 and 22 have center axes substantially aligned with each other. The opening 23 in the second rigid member 22 is smaller in diameter than the opening 21 in the first rigid member 20. The first rigid member 20 may correspond to one of the bracket members 2 and the second rigid member 22 may correspond to the air-cleaner support bracket member 5 in the air-cleaner support arrangement illustrated in FIG. 1.

Figure 5:
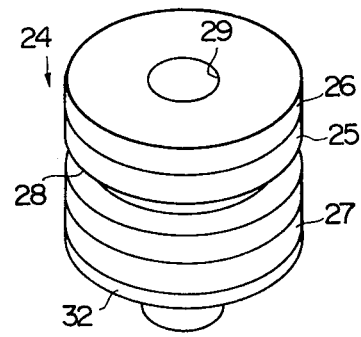
FIG. 5 is a perspective view of a laminar vibration absorptive structure forming part of the vibration-attenuating coupling device illustrated in FIG. 4.

The vibration-attenuating coupling device embodying the present invention is used to couple together the first and second rigid members 20 and 22 thus arranged and comprises a laminar vibration absorptive structure 24 which is shown more clearly in FIG. 5.

As will be seen from FIG. 5 as well as FIG. 4, the laminar vibration absorptive structure 24 has a generally cylindrical configuration and is constituted by three resilient members which consist of a generally cylindrical first resilient member 25 and disc-shaped second and third resilient members 26 and 27. The first resilient member 25 is formed with an axial bore and a circumferential groove 28 in its outer wall portion. The second and third resilient members 26 and 27 are respectively secured to the opposite end faces of the first resilient member 25 by, for example, an adhesive compound and are respectively formed with axial bores. The respective axial bores in the first, second and third resilient members 25, 26 and 27 are axially aligned with each other and have equal diameters, thereby forming in the vibration absorptive structure 24 a continuous axial bore 29 extending in part through the first resilient member 25, in part through the second resilient member 26 and further in part through the third resilient member 27. The first resilient member 25 is constructed of, for example, rubber and has a predetermined relatively large spring constant and accordingly a relatively large stiffness to deformation. Each of the second and third resilient members 26 and 27 is constructed of, for example, sponge and has a spring constant smaller than the spring constant of the first resilient member 25. The spring constant herein mentioned is defined as the compressive load required for producing a unit amount of deflection in a resilient material, viz., the ratio of a compressive load vs. the amount of deflection produced in a resilient material by the compressive load applied to the material.

The laminar vibration absorptive structure 24 thus constructed is fitted to the first rigid member 20 through the opening 21 in the rigid member 20 and the circumferential groove 28 in the first resilient member 25 of the vibration absorptive structure 24 as shown in FIG. 4. By reason of the relatively large spring constant and accordingly the relatively large stiffness of the first resilient member 25, the vibration absorptive structure 24 can be fitted with sufficient tightness to the first rigid member 20.

A rigid, tubular member or collar 30 is axially inserted into the axial bore 29 in the vibration absorptive structure 24 and is secured by, for example, an adhesive compound to the inner peripheral surface of the vibration absorptive structure 24. The collar 30 has opposite axial end faces respectively flush with the respective outer end faces of the second and third resilient members 26 and 27.

The vibration-attenuating coupling device embodying the present invention further comprises rigid fastening elements held in engagement with one of the opposite end faces of the vibration absorptive structure 24 and with the outer face of the second rigid member 22 and holding the vibration absorptive structure 24 retained to the second rigid member 22 with the other end face of the structure 24 attached to the inner face of the rigid member 22.

In FIG. 4, such fastening elements are shown comprising a bolt 31, a nut plate 32 and a washer 33. The bolt 31 has a head portion held in engagement with the outer face of the second rigid member 22 through the washer 33 and a threaded stem axially passed through the collar 30 with a leading end portion of the stem projecting outwardly from the collar 30. The nut plate 32 has an internally threaded central boss portion tightened to the outwardly projecting end portion of the threaded stem of the bolt 31 as shown. The nut plate 32 is thus held in engagement with the outer end face of the third resilient member 27 and has the second resilient member 26 closely attached to the inner face of the second rigid member 22. The second resilient member 26 is preferably secured to the inner face of the second rigid member 22 by an adhesive compound. Likewise, the nut plate 32 is securely attached to the outer end face of the third resilient member 27 by an adhesive compound. The first and second rigid members 20 and 22 are in this fashion coupled together by means of the vibration-attenuating coupling device thus constructed.

Such a vibration-attenuating coupling device is used typically in an air-cleaner support arrangement of an engine-driven vehicle with the first rigid member 20 constituted by, for example, one of the bracket members 2 secured to the hood ledge panel 1 and with the second rigid member 22 constituted by the air-cleaner support bracket member 5 in the air-cleaner support arrangement illustrated in FIG. 1. In this instance, the vibrations transmitted from the engine to the first rigid member 20 through the hood ledge panel 1 during operation of the engine cause the first resilient member 25 of the vibration absorptive structure 24 to elastically deflect and are thus partially dampened by the elastic deflection of the resilient member 25. The vibrations which have failed to be dampened in the first resilient member 25 are distributed to the second and third resilient members 26 and 27 of the vibration absorptive structure 24. Each of the second and third resilient members 26 and 27 is smaller in spring constant and accordingly in stiffness to deflection than the first resilient member 25 and is for this reason caused to elastically deflect to a greater degree than the first resilient member 25 is deflected. The vibrations which are transmitted from the first resilient member 25 to the second and third resilient members 26 and 27 are thus effectively dampened out in the second and third resilient members 26 and 27 so that the second rigid member 22 or the air-cleaner support bracket member 5 is practically perfectly isolated from the vibrations to which the first rigid member 20 is subjected.

Figure 6:
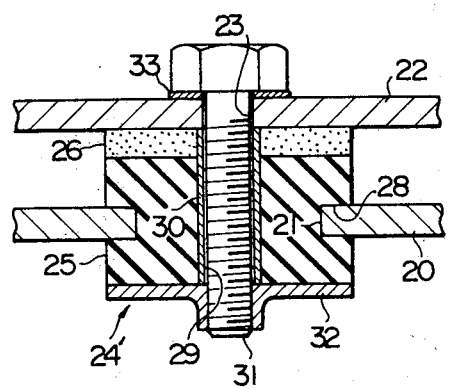
FIG. 6 is a view similar to FIG. 4 but shows a second embodiment of a vibration-attenuating coupling device according to the present invention.
Figure 7:
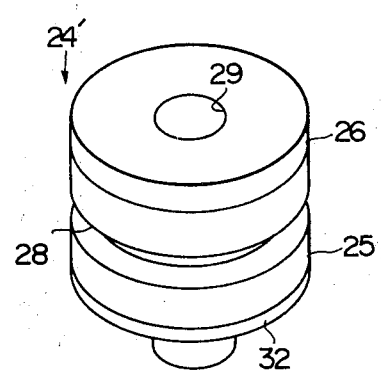
FIG. 7 is a view similar to FIG. 5 but shows a laminar vibration absorptive structure forming part of the vibration-attenuating coupling device illustrated in FIG. 6.

FIGS. 6 and 7 show a second embodiment of the vibration-attenuating coupling device according to the present invention. The embodiment herein shown is a simplified version of the embodiment described with reference to FIGS. 4 and 5 and is characterized in that the laminar vibration absorptive structure now designated by 24' is void of the third resilient member 27 and is composed of the first and second resilient members 25 and 26 alone. Thus, the rigid, tubular member or collar 30 received in the axial bore 29 in the vibration absorptive structure 24' has one axial end face flush with the outer end face of the first resilient member 25 and the nut plate 32 is attached to the outer end face of the first resilient member 25. Preferably, the nut plate 32 is securely attached to the outer end face of the first resilient member 25 by an adhesive compound.

When the vibration-attenuating coupling device thus constructed is in use and the first rigid member 20 is subjected to vibrations produced by, for example, an internal combustion engine installed on an automotive vehicle, the vibrations transmitted through the first rigid member 20 to the first resilient member 25 are partially dampened by the elastic deformation of the first resilient member 25 as in the embodiment of FIGS. 4 and 5. The vibrations which have failed to be dampened in the first resilient member 25 are transmitted to the second resilient member 26 of the vibration absorptive structure 24' and are in a major proportion attenuated by the elastic deformation of the second resilient member 26 which is smaller in spring constant than the first resilient member 25. The vibration absorptive structure 24' thus operative is more useful for the attenuation of vibrations with relatively low frequencies than the vibration absorptive structure 24 in the embodiment of FIGS. 4 and 5.

What is claimed is:

1. A vibration-attenuating coupling device for use with a first member having inner and outer faces and formed with an opening having a center axis and a second member having inner and outer faces and formed with an opening having a center axis substantially aligned with the opening in the first member, comprising:

a laminar vibration absorptive structure securely fitted to said first member through the opening therein and having opposite end faces one of which is securely attached to the inner face of said second member, and rigid fastening elements held in engagement with the other end face of the vibration absorptive structure and with the outer face of the second member through the opening in the second member, said vibration absorptive structure comprising a first resilient member having opposite end faces and fitted to said first member through the opening therein, a second resilient member secured between one end face of the first resilient member and the inner face of said second member and a third resilient member secured between the other end face of said first resilient member and one of said fastening elements, each of the second and third resilient members being smaller in spring constant than the first resilient member.

2. A vibration-attenuating coupling device as set forth in claim 1, in which said first member is secured to a body structure of an engine-driven vehicle and said second member forms part of a support structure having supported thereon the air cleaner of the engine installed on the vehicle.

3. A vibration-attenuating coupling device as set forth in claim 1, in which said laminar vibration absorptive structure is formed with an axial bore extending in part through said first resilient member, in part through said second resilient member and in part through said third resilient member, said coupling device further comprising a tubular member axially received in said axial bore, said fastening elements comprising a bolt having a head portion held in engagement with the outer face of said second member and a threaded stem axially extending through said tubular member with a leading end portion thereof axially projecting outwardly from the tubular member, and a nut plate having an internally threaded portion tightened to said leading end portion of the stem of the bolt, said nut plate being attached to the outer end face of said third resilient member.

4. A vibration-attenuating coupling device as set forth in claim 1, in which said first resilient member has a generally cylindrical outer wall portion formed with a circumferential groove through which the first resilient member is fitted to said first resilient member.

5. A vibration-attenuating coupling device as set forth in claim 1, in which said first resilient member is constructed of rubber and said second resilient member is constructed of sponge.

6. A vibration-attenuating coupling device as set forth in claim 1, in which said first resilient member is constructed of rubber and each of said second resilient member and said third resilient member is constructed of sponge.

* * * * *